United States Patent [19]

Kimura et al.

[11] 4,000,053
[45] Dec. 28, 1976

[54] METHOD FOR TREATMENT OF ALUMINUM SUBSTRATE

[75] Inventors: Tomoaki Kimura, Amagasaki; Hideo Simizu, Kobe; Ziniti Tatsumi, Hirakata, all of Japan

[73] Assignee: Nippon Paint Co., Ltd., Osaka, Japan

[22] Filed: Oct. 19, 1973

[21] Appl. No.: 407,982

[30] Foreign Application Priority Data

Oct. 28, 1972 Japan .............................. 47-108332

[52] U.S. Cl. ................................................ 204/181
[51] Int. Cl.$^2$ ................. C25D 13/06; C25D 13/20
[58] Field of Search ............. 204/140, 181, 33, 29, 204/38 A

[56] References Cited

UNITED STATES PATENTS

| | | | |
|---|---|---|---|
| 2,859,148 | 11/1958 | Altenpohl | 204/181 |
| 2,981,647 | 4/1961 | Schwartz | 148/6.14 |
| 3,622,473 | 11/1971 | Ohta et al. | 204/181 |
| 3,909,371 | 9/1975 | Ikegaya et al. | 204/38 A |

FOREIGN PATENTS OR APPLICATIONS

| | | | |
|---|---|---|---|
| 1,504,209 | 10/1967 | France | 204/181 |
| 46-21836 | 6/1971 | Japan | 204/181 |

*Primary Examiner*—Howard S. Williams
*Attorney, Agent, or Firm*—Wenderoth, Lind & Ponack

[57] ABSTRACT

A method for treatment of an aluminum substrate which comprises passing a direct electric current through the aluminum substrate having a colored surface caused by the formation of a film of $Al_2O_3 \cdot nH_2O$ thereon as the anode in an electrolyte solution so as to remove the said coloring.

3 Claims, No Drawings

METHOD FOR TREATMENT OF ALUMINUM SUBSTRATE

The present invention relates to a method for treatment of an aluminum substrate. More particularly, it relates to a method for removing the coloring of an aluminum substrate formed a film of $Al_2O_3 \cdot nH_2O$ thereon.

As well known, the coating of an aluminum substrate has usually been carried out by forming first a film of $Al_2O_3 \cdot nH_2O$ on the surface and then a coating film of a paint thereon in order to give a good durability to the said film. The formation of the film of $Al_2O_3 \cdot nH_2O$ is ordinarily performed by treating the aluminum substrate with hot water or steam. In case of the treatment with hot water, a small amount of an additive such as a base, an acid or a salt is often incorporated into water so as to shorten the treating time. In this formation of the film of $Al_2O_3 \cdot nH_2O$, however, the surface of the aluminum substrate may be colored in blackish brown to pale yellow under some treating conditions. Such coloring inclination is especially notable in the presence of the said additive. When a transparent coating film of a paint is formed on the said colored surface by immersion or spraying, the appearance of the resultant film becomes uneven and irregular due to the said previous coloring. Thus, the production of coated products having a uniform appearance has been difficult hitherto.

For overcoming the above drawback, extensive examination and strict control have been made on treating conditions in the formation of the film of $Al_2O_3 \cdot nH_2O$. However, the mechanism of the said coloring remains unclarified so that an effective method for the prevention of the said coloring is not yet found out.

It has now been unexpectedly found that the coloring of an aluminum substrate on the surface caused by the formation of a film of $Al_2O_3 \cdot nH_2O$ disappears to a satisfactory extent when a direct electric current is passed through the aluminum substrate as the anode in an electrolyte solution. The present invention is based on this quite unexpected finding.

According to the present invention, there is provided a method for treatment of an aluminum substrate which comprises passing a direct electric current through the aluminum substrate having a colored surface caused by the formation of a film of $Al_2O_3 \cdot nH_2O$ thereon as the anode in an electrolyte solution so as to remove the said coloring.

The term "aluminum substrate" herein used is intended to mean a material consisting of aluminum as the main component. It may contain any other metal as an optional component. Usually, the one containing small amounts of copper, silicon, iron, manganese, magnesium, zinc, chromium, titanium, zirconium and the like in addition to aluminum is employed.

In the formula $Al_2O_3 \cdot nH_2O$, n represents a number, usually not more than 3. When n is 1 to 2, $Al_2O_3 \cdot nH_2O$ is called "boehmite". In case of n being 3, it is called "bayerite".

The formation of the film of $Al_2O_3 \cdot nH_2O$ may be effected in a per se conventional manner. Usually, an aluminum substrate subjected to preliminary treatments such as degreasing and etching is treated with hot water or steam for several minutes to several ten minutes. In case of the treatment with hot water, it is favorable to add an additive such as a base, an acid or a salt in an amount of 0.1 to 0.5% by weight to water for shortening the treating time. Preferred examples of such additive are ammonia, potassium hydroxide, an alkylamine (e.g. diethylamine, trimethylamine), an alkanolamine (e.g. diethanolamine, triethanolamine), etc. When the treatment system becomes too strongly basic, however, the elution of aluminum ion from the aluminum substrate is caused. Therefore, an appropriate pH value (e.g. pH 6.5 to 11.0) should be maintained, if necessary, by the addition of an acid. Though the coloring of the aluminum substrate becomes marked in the presence of the additive, it can be satisfactorily removed regardless of its extent according to the method of the invention, and there is not required any particular consideration on the kinds and the amounts of the additive.

The thickness of the film of $Al_2O_3 \cdot nH_2O$ is not particularly limited and may be several angstroms to several microns in usual.

By the formation of the film of $Al_2O_3 \cdot nH_2O$, the aluminum substrate is frequently colored in blackish brown to pale yellow on the surface. The relationship between the coloring state, i.e. the shade and the deepness of color, and the treating condition is not clarified excepting the influence caused by the presence of the additive as above mentioned.

Through the aluminum substrate which is colored by the formation of the film of $Al_2O_3 \cdot nH_2O$ on the surface as the anode, a direct electric current is passed in a solution of an electrolyte (e.g. a base, an acid, a salt) at a current density usually of about 0.01 to 2 $A/dm^2$ to remove the said coloring. The removal of the coloring can be attained more completely and rapidly under a higher voltage of the direct electric current and with a longer duration of the passing time of the direct electric current. Usually, a satisfactory result can be obtained by the passage of the direct electric current under a voltage of 30 to 500 V, preferably 50 to 150 V, for several ten seconds to several minutes. As the cathode, there may be used the one of any electroconductive material (e.g. iron, nickel, carbon).

In the above operation, the employment of the aluminum substrate as the anode is essential. When the aluminum substrate is used as the cathode, the disappearance of the coloring cannot be seen.

On the film of $Al_2O_3 \cdot nH_2O$ of the thus treated aluminum substrate whose coloring has been removed, a transparent paint composition may be applied in a conventional manner, for instance, by immersion or spraying to form a coating film.

Particularly advantageous is to carry out the removal of the coloring caused by the formation of a film of $Al_2O_3 \cdot nH_2O$ in a paint composition for electrodeposition or to carry out the formation of a coating film with a paint composition on the colored surface of an aluminum substrate having a film of $Al_2O_3 \cdot nH_2O$ thereon by electrodeposition, because the removal of the coloring and the formation of the coating film can be achieved in a single step.

Thus, a direct electric current is passed through a water-solubilized paint composition using as the anode an aluminum substrate colored on the surface by the formation of a film of $Al_2O_3 \cdot nH_2O$, whereby the coloring is removed as well as the coating film of the paint composition is formed. As the watersolubilized paint composition, there may be used any one conventionally employed in electrodeposition. Preferred examples are the compositions containing an acrylic resin, an alkyd resin, an epoxy resin, a melamine resin, a polyester resin or the like.

For obtaining a transparent or translucent colored product, an appropriate pigment or dye may be incorporated in the said paint composition.

The coating film formed on the aluminum substrate according to the invention is characterized by having a uniform color phase originating in the paint composition as used, unlike conventionally formed coating films of which the color phase is much influenced by the coloring of the aluminum substrate. Especially when the electrodeposition is adopted for achieving the removal of the coloring and the formation of the coating film in a single step, the obtained coating film is excellent in various physical and chemical properties such as impact strength, alkali resistance and sulfurous acid resistance. Thus, the durability of the coating film itself or the product coated therewith on the surface is equal to or much superior to that of a coating film formed on an Alumite plate or on a chromate or phosphate-chromate treated plate.

In the method of this invention, it is advantageous that any apparatus for oxidation of the anode required in a conventional Alumite processing is not needed. It is also advantageous that any substance which may contaminate the environment such as chromium or phosphorus is not employed for undercoating.

Practical and presently preferred embodiments of the invention will be illustratively shown in the following Examples wherein % is by weight.

EXAMPLE 1

An aluminum plate previously subjected to degreasing, etching and neutralizing is immersed in a 0.1% aqueous solution of triethanolamine at 70° to 100° C for about 8 minutes. The resultant plate colored in brown on the surface is, after washed with water, connected to the anode of a direct electric current source and placed into a bath of a 10% anionic thermosetting acrylic resin solution. An insoluble metal plate (stainless steel plate) is connected to the cathode, and a direct electric current is passed under a voltage of about 90 V for 2.5 minutes to effect the electrodeposition. The aluminum plate is taken out, washed with water to remove excess resin adsorbed thereon and dried at 190° C for about 30 minutes whereby a product coated with a colorless and transparent coating film is obtained. The durability is excellent. The coloring on the surface of the aluminum plate is removed.

When a colored paint solution is employed in the above procedure, there can be obtained a colored product having a good appearance.

EXAMPLE 2

An aluminum plate previously subjected to degreasing, etching and neutralizing is immersed in a 0.5% aqueous solution of diethanolamine adjusted to pH 9.0 with nitric acid at 90° C for about 7 minutes. The resultant aluminum plate colored in blackish brown on the surface is washed with water and subjected to the electrodeposition as in Example 1 whereby a product coated with a colorless and transparent coating film is obtained. The durability is excellent. The coloring on the surface of the aluminum plate is removed.

EXAMPLE 3

An aluminum plate previously subjected to degreasing, etching and neutralizing is immersed in a 0.2% aqueous solution of ammonium carbonate adjusted to pH 7.7 at 90° C for about 5 minutes. The resultant plate colored in yellowish brown on the surface is connected to the anode of a direct electric current source and placed into a bath containing a solution having the same composition as used for the immersion, the said bath being made of stainless steel. The bath is connected to the cathode, and a direct electric current is passed at 25° C under a voltage of about 70 V for 1 minute. The aluminum plate is taken out, washed with water and dried. The resultant aluminum plate shows light silver white.

The color difference is determined on the aluminum plate before the formation of the $Al_2O_3.nH_2O$ film, after the formation of the $Al_2O_3.nH_2O$ but before removal of the color and after the formation of the $Al_2O_3.nH_2O$ and removal of the color by the use of a color difference meter ("Color Machine M-20" manufactured by Japan Color Machine Co., Ltd.). The results are shown in Table 1.

| | L ($\Delta L^*$) | a ($\Delta a$) | b ($\Delta b$) |
|---|---|---|---|
| Before formation of $Al_2O_3 . nH_2O$ film | 42.20 (−) | 0.50 (−) | −3.26 (−) |
| After formation of $Al_2O_3 . nH_2O$ film but before removal of the color | 38.50 (−3.70) | 2.41 (+1.91) | 4.77 (+8.03) |
| After formation of $Al_2O_3 . nH_2O$ film and after removal of the color | 51.98 (+9.78) | 1.40 (+0.90) | −3.48 (−0.22) |

Note:
*variation based on the color before formation of $Al_2O_3 . nH_2O$ film.

What is claimed is:

1. A method for preparing an aluminum substrate having a substantially uncolored film of $Al_2O_3.nH_2O$ on the surface thereof, which consists essentially of treating an aluminum substrate with hot water or steam to form a colored film of $Al_2O_3.nH_2O$, wherein n is at most 3, and then passing a direct electric current through the aluminum substrate as an anode at a current density of 0.01 to 2A/dm² and under a voltage of 30 to 500 V for several tens of seconds to several minutes in an electrolyte solution containing a paint resin solubilized therein to remove the coloring on the film and to deposit the resin thereupon.

2. A method according to claim 1, wherein the aluminum substrate is treated with hot water containing 0.1 to 0.5% by weight of an additive selected from the group consisting of an acid, a base and a salt for several minutes to several tens of minutes.

3. A method according to claim 2, wherein the additive is selected from the group consisting of ammonia, potassium hydroxide, diethylamine, trimethylamine, diethanolamine and triethanolamine.

* * * * *